United States Patent [19]

Mantel

[11] Patent Number: 4,475,435
[45] Date of Patent: Oct. 9, 1984

[54] IN LINE BULLET FEEDER

[75] Inventor: Robert W. Mantel, Sussex, Wis.

[73] Assignee: Mantel Machine Products, Inc., Menomonee Falls, Wis.

[21] Appl. No.: 469,731

[22] Filed: Feb. 25, 1983

[51] Int. Cl.³ .............................................. F42B 33/00
[52] U.S. Cl. ......................................... 86/26; 86/43; 86/44; 86/25; 86/45
[58] Field of Search .................. 86/45, 43, 23, 25, 44, 86/46

[56] References Cited

U.S. PATENT DOCUMENTS

| 3,036,488 | 5/1962 | Bihler | 86/46 |
| 3,602,084 | 8/1971 | Corcoran | 86/45 |
| 4,228,724 | 10/1980 | Leich | 86/23 |
| 4,331,063 | 5/1982 | Schaenzer | 86/23 |

Primary Examiner—Stephen J. Lechert, Jr.
Assistant Examiner—Howard J. Locker
Attorney, Agent, or Firm—Ronald E. Barry

[57] ABSTRACT

A bullet feed assembly for a shell casing reloader, the assembly including a housing having a passage, a gravity feed bullet reservoir connected to the upper end of the passage, a first pair of catch members pivotally mounted in the housing for movement into the passage, to catch the bullets, the catch members including cam surfaces engageable by movement of a shell casing into the passage to release the bullet, and a pair of latch members mounted for pivotal movement into and out of the passage to prevent upward movement of the bullet in the passage.

14 Claims, 5 Drawing Figures

IN LINE BULLET FEEDER

THE BACKGROUND OF THE INVENTION

The cost of ammunition for hunting and target practice has made it a practical necessity to reload the cartridges, or shells, after use. A number of manual, semi-automatic and automatic shell reloader systems have been developed for both shotgun and brass cartridges. However, reloading the bullet into the neck of a brass shell has, for the most part, been done manually or, in some instances, a mechanical lateral loading mechanism has been employed with some success. Where large numbers of shells are to be reloaded, the slowest step in the system has been the loading of the bullet into the neck of the shell whether manually or automatically.

SUMMARY OF THE INVENTION

It is the primary objective of the present invention to provide an automatic bullet feed assembly which operates at the same speed as the rest of the system. This has been achieved by providing an inline or gravity-feed system in which the bullet is automatically released by the motion of the shell and temporarily locked into position so that the bullet will be forced into the neck of the shell. The lock and catch functions are achieved by cam mechanisms actuated either by the weight of the bullet or the motion of the shell in picking up the bullet.

THE DRAWINGS

DESCRIPTION

Figure 1:
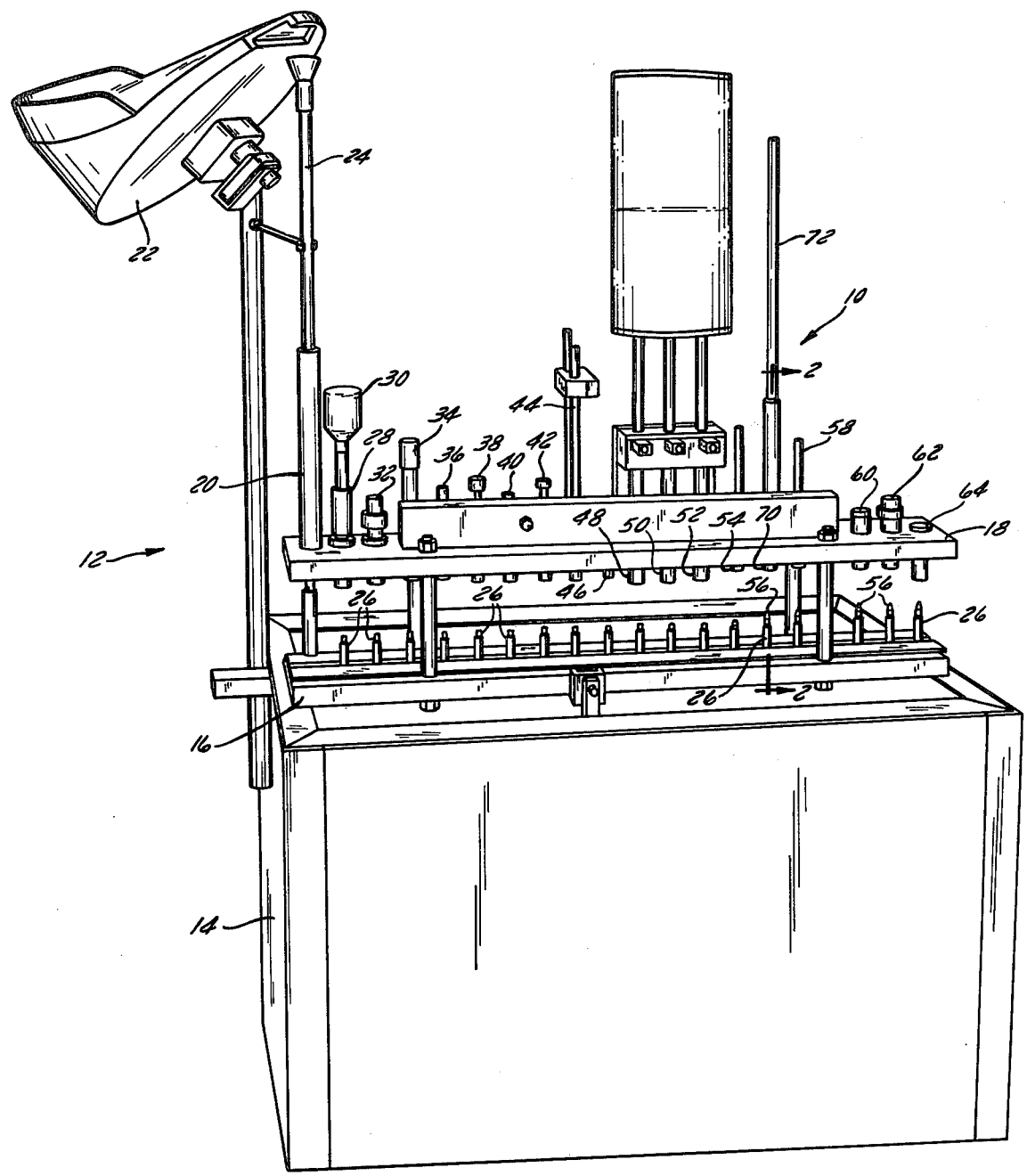
FIG. 1 is a perspective view of a fully automatic inline progressive brass shell reloader with the inline bullet feed assembly, according to the present invention, mounted on a function operating head.

The inline bullet feed assembly 10 according to the present invention is designed for use on shell reloaders of either the manual or automatic type. Referring to FIG. 1 an inline progressive brass shell reloader 12 is shown which incorporates the inline bullet feed assembly 10 of the present invention at the bullet load station. This type of reloader includes a base 14 having a step-by-step progressive type shell carriage 16 which is movable toward and away from a function head 18 once in each step of advance of the shell. Typical reload functions are performed on the shell in each reciprocal movement of the carriage 16. In this regard, the head 18 includes the following stations:

A case feed station 20 wherein the brass shells or cases are fed by a conventional automatic rotary hopper 22 into a tube 24 in a position to be fed to the carriage 16. One shell or case 26 is fed from the tube 24 to the carriage in each step of motion of the carriage.

A case lube station 28 lubricates each case from a reservoir 30.

A case probe/neck sizer 32 checks the case for foreign matter and sizes the neck of the shell. A micro switch shutoff is provided in the probe in the event there is foreign matter in the shell casing.

A sizer die 34 to size the full length of the casing, de-capping die 36, a neck expander 38 and a ringer probe 40 are provided at the next four stations.

A primer pocket ream 42, primer seating die 44 and a new primer probe 46 are provided at the next three stations.

Powder is added to the shell casing at stations 48, 50 and 52 with a powder sensor 54 provided to check the powder level.

The bullet feed assembly 10 is located at the next station and is used to place a bullet 56 in the neck of a casing, as more particularly described hereinafter.

A bullet in case sensor 58, bullet seating die 60 and a crimping die 62 are provided at the next three stations to set the bullet 56 in place.

A counter 64 is provided at the last station to indicate the number of rounds reloaded. The completed rounds are rejected from the carriage at the last station.

Figure 5:
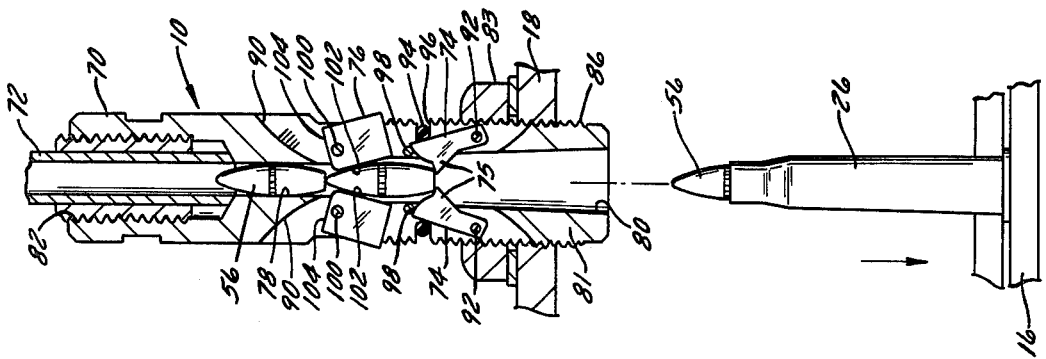
FIG. 5 is a view similar to FIG. 2 showing the bullet seated in the neck of the shell with the next bullet in position to be picked up by the next shell.
Figure 3:
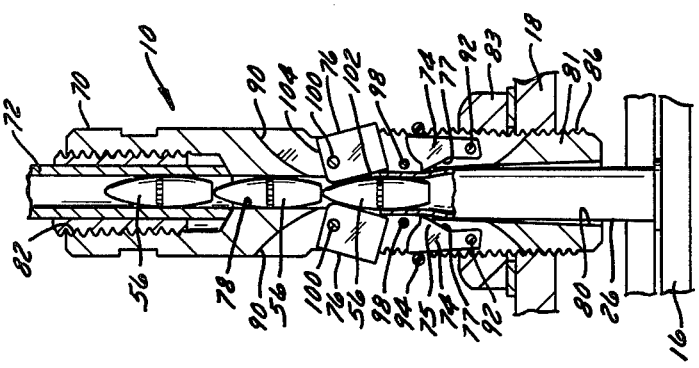
FIG. 3 is a view similar to FIG. 2 showing the shell fully inserted into the assembly.

The inline bullet feed assembly 10 is shown in cross-section in FIGS. 2 through 5. The assembly 10 generally includes a base member of housing 70 having a central bore or passage 78. A bullet reservoir 72 is mounted on the upper end of the tubular housing 70. Bullets 56 are fed by gravity from the reservoir through the passage 78 in the housing 70 to the casing 26. Means in the form of a first pair of lower cam or dog members 74 are provided in the housing 70 to hold or catch the bullets 56 in the passage 78 of the housing 70. When a casing 26 is moved into the housing 70, as seen in FIG. 3, the dog members 74 will be cammed out of the path of motion of the bullet. The bottom bullet 56 is prevented from moving upward in the passage 78 in the housing 70 by means of a second pair of upper cam or dog members 76 which lock the bullet in position if the bullet is pushed upward by the neck of the casing 26. Upon removal of the casing 26 from the housing 70, the bullet 56 will be automatically released from the upper dog members 76. The dogs 74 are biased by means of a rubber ring 94 to move inward as seen in FIG. 5, to catch the next bullet 56 so that the bullet will not drop through the housing 70.

More particularly, the housing 70 includes a central bore or passage 78, a counter bore 80 at the lower end, and a threaded counter bore 82 at the upper end. The counter bore 80 terminates at a shoulder 84 at the lower end of bore 78. A threaded section 86 is provided around the lower portion 81 of the housing 70 for mounting the housing 70 in the head 18. A nut 83 is provided on the headed section 86 of the housing 70 to lock the housing 70 in place. A slot 90 is provided in the center of the housing 70 which intersects the bore 78 and counter bore 80.

Figure 2:
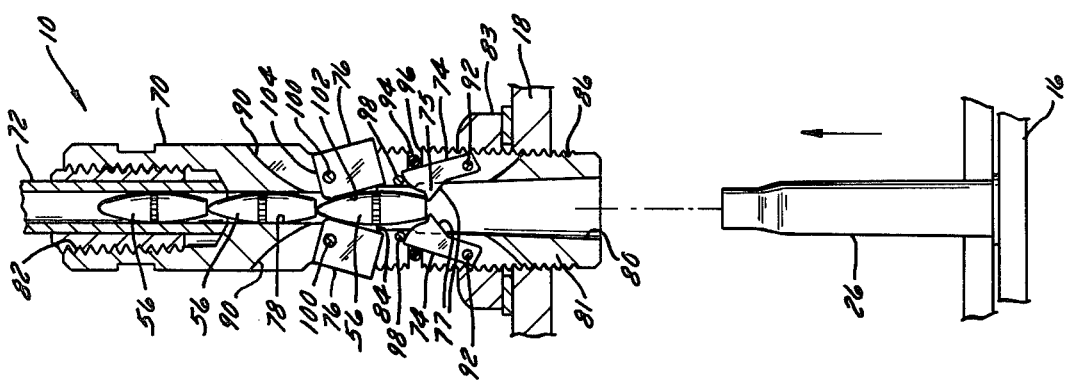
FIG. 2 is a cross-section view in elevation of the bullet inline bullet feed assembly with a shell positioned for movement into the assembly.

The lower cam or dog members 74 are mounted on pivot pins 92 in the slot 90 so that they can pivot into the counter bore 80. The dog members 74 are biased inward by means of the rubber O-ring 94 provided in the annular groove 96 on the lower portion of the housing 70. The inward movement of the lower dog members 74 is limited by means of a pair of stop pins 98. Each of the dog members 74 is provided with a tab 75 which is tapered to provide a cam surface 77. The dog members 74 are thus biased inwardly so that the tabs 75 prevent the bullet 56 from dropping through the passage 78 in the housing 70 as seen in FIG. 2. The dog members 74 are released from the bullet 55 by means of the upward movement of the casing 26. Referring to FIG. 3 the casing 26 is shown in engagement with the shoulder 84. The neck of the casing engages the cam surface 77 to force the dog members 74 to pivot outwardly as the bullet casing moves upward to move the tabs 75 out of the passage 78. The bullet 56 will then be free to slip into the open neck of the casing 26.

It should be noted that the bullet 56 is tapered slight at the lower end to allow the bullet to enter the open neck of the shell casing. However the diameter of opening is equal to the diameter of the bullet to provide a snug fit. The bullet 56 is therefore prevented from moving upward in the bore 78 by means of the upper pair of cam or dog members 76. The upper dog members 76 are pivotally mounted in slot 90 on pins 100 for pivotal movement from a latch position where the side edges 102 of the members 76 are located in a spaced relation in passage 78 to a release position where the upper edges 104 are located in a spaced relation outside of the passage 78. The distance between the edges 102 should be less than the diameter of the bullet. The distance between the upper edges 104 in the release position should be greater than the diameter of the bullet.

As seen in FIG. 3, the upward motion of the bullet 56 will tend to pivot the dog members 76 into the bore 78. However, since the distance between the inside edges 102 of the dog members 76 is less than the diameter of the bullet 56, the bullet will become wedged between the dog members 76. As the lower bullet 56 is moved out of the bore 78 with the casing 26, the dog members 76 will pivot with the bullet releasing the lower bullet from the dog members 76. As the bullet 56 moves past the dog members 74 the O-ring 94 will bias the dog members 74 inward into engagement with pins 98.

Figure 4:
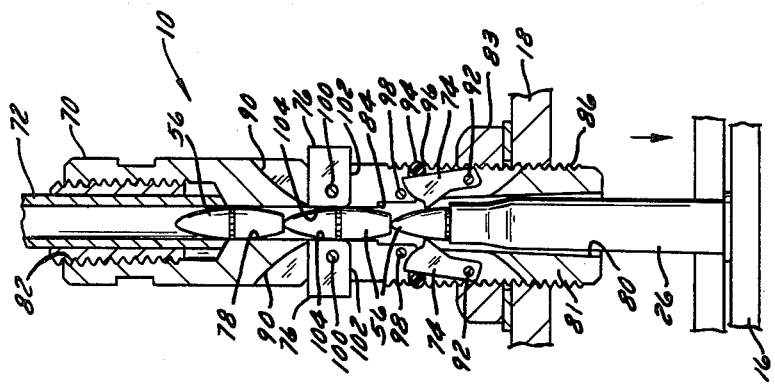
FIG. 4 is a view similar to FIG. 3 showing the shell partially removed from the assembly.

The next bullet 56 in the passage 78 will move downward into engagement with the upper edges 104 of the dog members 76 pivoting the dog members 76 outward so that the bullet 56 can pass between the upper edges 104, as shown in FIG. 4. The edges 104 being spaced apart a distance greater than the diameter of the bullet. The tab 75 on the lower dog members 74 will be returned to the counter bore 80 so that the next bullet 56 rests on the tab 75 as seen in FIG. 5. The upper dog members 76 will return to the lock position when the bullet 56 is resting on the tab 75.

Although the inline bullet feed assembly 10 is shown in an inline fully automatic shell reloader, it should be noted that the bullet feed assembly can be used with other automatic, semiautomatic or manual reloaders.

The embodiments of the invention in which an exclusive property or priviledge is claimed, are defined as follows:

1. An inline bullet feed assembly for seating a bullet in the open end of a shell, said assembly comprising
   a housing,
   a passage through said housing,
   a gravity feed bullet reservoir connected to one end of said passage,
   catch means in said passage for preventing bullets from dropping through the passage, said catch means being responsive to the presence of a shell in said passage to release said bullet and allow the bullet to enter the open end of said shell, and
   latch means in said passage spaced upwardly from said catch means for preventing upward movement of the bullet supported in the passage by said catch means whereby the bullet will be forced into the open end of the shell.

2. The assembly according to claim 1 wherein said catch means comprises
   a first pair of dog members pivotally mounted in said housing for movement into and out of said passage.

3. The assembly according to claim 2 wherein each of said first pair of dog members includes
   a tab located in a position to support the bottom of a bullet.

4. The assembly according to claim 2 or 3 including means for biasing said dog members inwardly into said passage.

5. The assembly according to claim 1 wherein said latch means includes
   a second pair of dog members pivotally mounted in said housing,
   said dog members being movable between a latch position in said passage and a release position outside of said bore,
   the side edges of said dog members being located a spaced distance apart less than the diameter of said bullet when in the latch position and the upper edges spaced apart a distance greater than the diameter of the bullet when the members are pivoted outward to the release position.

6. The assembly according to claim 5 wherein said catch means includes
   a first pair of dog members pivotally mounted in said housing for movement into and out of said passage.

7. The assembly according to claim 6 wherein said catch means includes
   means for biasing said first pair of dog members inwardly into said passage.

8. An inline bullet feed assembly for automatically setting a bullet into the open end of a shell in a progressive type shell reloader, said feed assembly comprising,
   a base member having an axially extending bore,
   means for feeding bullets into said bore,
   a pair of catch members mounted in said base member for movement to a position to catch bullets in said bore,
   means for biasing said catch members to the catch position, said catch members including
   cam means responsive to the presence of a shell in said bore to release the bullet from said catch member, and
   latch means mounted in said base member to latch the bullet in said bore whereby the movement of the shell into said bore will seat the bullet in the open end of the shell.

9. The assembly according to claim 8 including
   means for pivotally mounting the catch members in said base member and wherein said latch means includes a pair of latch members pivotally mounted in said base member for movement into said bore on upward movement of a bullet in said bore and out of said bore on downward movement of a bullet in said bore.

10. The assembly according to claim 9 wherein said latch members each include
    a rectangular plate having one of the side edges projecting into said bore in the latch position to prevent upward movement of the bullet in the bore,
    said latch members being pivotable on engagement by a bullet moving down the bore to a position where the upper edge is outside of the bore.

11. The combination with a shell reloader of the type wherein a shell is moved progressively from station to station, means for automatically replacing a bullet in the neck of the shell, said means comprising a housing having a bore, means attached to said housing for storing a number of bullets for gravity feed into said bore, catch means within said housing to catch the bullets in said bore, said catch means being movable in response to the movement of a shell into the bottom of said bore to release the bullet from said catch means whereby the bullet can enter the open end of the shell, and latch means mounted in said housing above said catch means for preventing the bullet supported in the bore from moving upward when said bullet is forced into the open end of the shell.

12. The combination according to claim 10 wherein said catch means includes a cam member pivotally mounted in said houing for movement into and out of said bore.

13. The combination according to claim 12 including means for biasing said cam member inwardly into said bore.

14. The combination according to claim 10 wherein said latch means includes a rectangular plate mounted for pivotal movement into and out of said bore.

* * * * *